US012129834B2

(12) United States Patent
Canales Segade et al.

(10) Patent No.: US 12,129,834 B2
(45) Date of Patent: Oct. 29, 2024

(54) WIND TURBINE AUXILIARY POWER SYSTEM

(71) Applicant: Siemens Gamesa Renewable Energy Innovation & Technology S.L., Sarriguren (ES)

(72) Inventors: Jose María Canales Segade, Durango (ES); Santiago Carneiro, Guipúzcoa (ES); Soeren Kirkeby, Holstebro (DK); Eduardo Miguel Garcia de Cortazar, Vitoria-Gasteiz (ES); Miguel Rodriguez Vazquez, Gorraiz (ES); Fernando Santodomingo Llamas, Las Palmas de Gran Canaria (ES)

(73) Assignee: Siemens Gamesa Renewable Energy Innovation & Technology S.L., Sarriguren (ES)

( * ) Notice: Subject to any disclaimer, the term of this patent is extended or adjusted under 35 U.S.C. 154(b) by 6 days.

(21) Appl. No.: 18/031,177

(22) PCT Filed: Oct. 12, 2021

(86) PCT No.: PCT/EP2021/078089
§ 371 (c)(1),
(2) Date: Apr. 11, 2023

(87) PCT Pub. No.: WO2022/089929
PCT Pub. Date: May 5, 2022

(65) Prior Publication Data
US 2023/0374973 A1    Nov. 23, 2023

(30) Foreign Application Priority Data
Oct. 26, 2020    (EP) .................................... 20382928

(51) Int. Cl.
*F03D 9/25* (2016.01)
*H02J 3/38* (2006.01)

(52) U.S. Cl.
CPC .............. *F03D 9/257* (2017.02); *H02J 3/381* (2013.01)

(58) Field of Classification Search
CPC .......... F03D 9/257; F03D 9/255; H02J 3/381; F05B 2260/76; Y02E 10/76
See application file for complete search history.

(56) References Cited

U.S. PATENT DOCUMENTS 10,910,975 B2 * 2/2021 Hillebrandt ............. H02M 1/32
11,424,704 B2 * 8/2022 Hillebrandt ............. H02M 1/32
(Continued)

FOREIGN PATENT DOCUMENTS

EP    2 506 384 A1    10/2012
EP    3 413 423 A1    12/2018
(Continued)

OTHER PUBLICATIONS

International Search Report & Written Opinion for PCT/EP2021/078089 issued on Jan. 20, 2022.

*Primary Examiner* — Pedro J Cuevas
(74) *Attorney, Agent, or Firm* — Schmeiser, Olsen & Watts LLP

(57) ABSTRACT

A wind turbine auxiliary power system configured to receive electrical power from an electrical power generating system of the wind turbine or from a power grid. The auxiliary power system includes an auxiliary transformer having a primary side configured to be coupled to the electrical power generating system of the wind turbine and a secondary side configured to be coupled to auxiliary power consumers of the wind turbine and to provide transformed electrical power to the consumers. It further includes an electronic on-load tap changer provided on the auxiliary transformer, wherein (Continued)

the electronic on-load tap changer includes taps on at least one transformer winding of the auxiliary transformer and semiconductor switches that are coupled to the taps and that are configured such that by controlling the semiconductor switches, the transformation ratio of the auxiliary transformer is adjustable to compensate for voltage variations on the primary side of the auxiliary transformer.

15 Claims, 6 Drawing Sheets

(56) References Cited

U.S. PATENT DOCUMENTS

| | | | |
|---|---|---|---|
| 11,451,065 B1* | 9/2022 | Worku | G05B 19/042 |
| 2009/0102438 A1 | 4/2009 | Raedy et al. | |
| 2011/0304141 A1* | 12/2011 | Van Dyck | H02J 3/50 |
| | | | 290/44 |
| 2015/0073610 A1 | 3/2015 | Schnetzka et al. | |
| 2020/0011297 A1* | 1/2020 | Hillebrandt | H02P 9/006 |
| 2020/0014317 A1* | 1/2020 | Hillebrandt | H02P 13/06 |
| 2021/0119562 A1* | 4/2021 | Hillebrandt | F03D 9/255 |
| 2022/0308605 A1* | 9/2022 | Rebollo López | G05F 1/20 |
| 2024/0120740 A1* | 4/2024 | Yin | F03D 7/0284 |

FOREIGN PATENT DOCUMENTS

| | | |
|---|---|---|
| EP | 3 599 376 A1 | 1/2020 |
| WO | 2016/165739 A1 | 10/2016 |

* cited by examiner

WIND TURBINE AUXILIARY POWER SYSTEM

CROSS-REFERENCE TO RELATED APPLICATIONS

This application claims priority to PCT Application No. PCT/EP2021/078089, having a filing date of Oct. 12, 2021, which claims priority to European Application No. 20382928.8, having a filing date of Oct. 26, 2020, the entire contents both of which are hereby incorporated by reference.

FIELD OF TECHNOLOGY

The following relates to a wind turbine auxiliary power system including an auxiliary transformer. It further relates to a method of operating an auxiliary power system of a wind turbine.

BACKGROUND

The use of wind turbines as a renewable power source is proliferating. Wind turbines, also termed wind turbine generators (WTGs) are generally connected to a power grid and need to fulfill certain requirements that ensure grid stability and power quality. Grid operators set out these requirements in so-called grid codes. The grid code for example defines the required capabilities of the wind turbine to withstand high-voltage and low-voltage situations on the power grid. These requirements can for example be provided in form of a low-voltage ride-through (LVRT) or high-voltage ride-through (HVRT) envelopes. Such exemplary HVRT envelope is shown in FIG. 1. The envelope 301 shows over which time t (in seconds s) the wind turbine must be able to operate at certain levels of over-voltage (axis U(T)/Ur indicating the over-voltage, wherein 1.0 corresponds to nominal operating voltage Ur). In the example of FIG. 1, the wind turbine would need to be capable of operating 33 ms at an over-voltage of 1.5 p.u. (point A); 150 ms at 1.4 p.u. (point B); and 1 s at 1.3 p.u. (point C). It would further need to be capable of operating for one minute at an over-voltage of 1.25 p.u. (point D) and to continuously operate at an over-voltage of 1.13 p.u. (point E). It should be clear that these requirements are only exemplary, and that such HVRT or LVRT envelopes that define the required wind turbine capability depend on the particular power grid.

Several protection mechanisms have been devised to allow the wind turbine to operate in such over-voltage or under-voltage conditions. A possibility that is commonly employed is for example the over-sizing of the electrical components of the wind turbine so that the components can deal with higher voltages. As an example, the auxiliary power system of the wind turbine may be adapted for being able to operate at such over-voltage conditions by increasing the insulation level of the auxiliary power system components and by requiring that the components are operable at the respective higher voltages. Over-sizing of these and other components of the wind turbine result in increased space and weight requirements. The space available in the nacelle of the wind turbine is, however, limited. Also, such over-sizing will result in increased costs for the respective wind turbine components. Furthermore, in order to demonstrate the capability of these components to operate under the required HVRT/LVRT conditions, field testing generally needs to be performed to show the capability of the components to withstand respective grid events. However, such one-time testing cannot validate the capability of the components to withstand respective events during the whole lifetime of the wind turbine, resulting in an increased risk of failure. This problem is even more prominent with the more stringent requirements of recent grid codes.

The document EP 3 413 423 A1 is related to a system for providing electrical power to wind turbine components. The wind turbine components are arranged to be selectively connected to a busbar through a first or second path. The system is configured to select the first path if the voltage at the busbar is the main voltage, and to select the second path if the voltage at the busbar is an auxiliary power voltage provided, e.g., by a diesel generator.

The document WO 2016/165739 A1 relates to a renewable energy system comprising a system transformer with adjustable transmission ratio, the primary side of which is connected to the power generating unit and the secondary side of which can be connected to a power network. The transmission ratio is adjusted in dependence on at least one of a system reactive power, a system reactive power requirement, a primary/secondary side system voltage, a primary/secondary side system voltage requirement, an operating point of the power generating unit and an operating point of the system.

The document US 2009/0102438 A1 is related to a 3-phase electronic tap changer commutation device to be utilized in electronic regulators and provides a specific transformer winding topology and commutation technique that improves performance and reduces costs.

The document EP 2 506 384 A1 relates to a method of operating a tap changer of a transformer or a voltage regulator in a power grid. In embodiments, the method comprises obtaining a load forecast and determining an average voltage profile based thereon. Tap positions of the tap changer for leveling the average voltage profile are estimated and respective switching signal commands are provided to the tap changer.

SUMMARY

An aspect relates to mitigating at least some of the drawbacks mentioned above and to provide an improved auxiliary power system that is able to better withstand respective events on the power grid.

According to an embodiment of the present invention, a wind turbine auxiliary power system is provided that is configured to receive electrical power from an electrical power generating system of the wind turbine or from a power grid (e.g., via a wind turbine transformer). The auxiliary power system comprises an auxiliary transformer having a primary side configured to be coupled to the electrical power generating system of the wind turbine and a secondary side configured to be coupled to auxiliary power consumers of the wind turbine and to provide transformed electrical power to the auxiliary power consumers. It further comprises an electronic on-load tap changer provided on the auxiliary transformer. The electronic on-load tap changer comprises taps on at least one transformer winding of the auxiliary transformer, for example on a winding on the primary side (primary winding), a winding on the secondary side (secondary winding) or both. The electronic on-load tap changer further comprises semiconductor switches that are coupled to the taps and that are configured, in particular connected, such that by controlling the semiconductor switches, the transformation ratio of the auxiliary transformer is adjustable to compensate for voltage variations on the primary side of the auxiliary transformer.

In an embodiment, the auxiliary power system is configured to control the semiconductor switches to compensate for the voltage variations while the wind turbine is coupled to the power grid. The wind turbine may in particular be connected to the power grid so as to supply power to the power grid and/or receive power from the power grid. A (main) circuit breaker between the power grid and the wind turbine may for example be in a closed state.

In an embodiment, the auxiliary power system further comprises a controller configured to control the semiconductor switches to compensate for such voltage variations while the wind turbine is coupled to the power grid.

The voltage variations may be based on or result from voltage variations on the power grid. The voltage variations comprise under- and/or overvoltages relative to a nominal voltage on the primary side of the auxiliary transformer, e.g., the control may be performed so as to compensate both undervoltages and overvoltages on the primary side.

Accordingly, when voltage variations on the power grid, such as under- and over-voltages, result in respective voltage variations in the electrical power generating system of the wind turbine, these can be compensated by the auxiliary power system by changing the tap setting of the tap changer. Consequently, the voltage variations that are experienced by the auxiliary power consumers are reduced significantly. Depending on the resolution of the tap changer, i.e., on the number of taps and the switching configuration, these voltage variations can be reduced significantly so that the auxiliary power consumers do not need to be overrated or oversized and do not need to be provided with an increased insulation level. Furthermore, by providing an electronic tap changer with semiconductor switches, the response time of the tap changer is fast so that a fast reaction to respective over-/under-voltage events becomes possible. The tap changer may for example be configured to perform the tap changing within two, within one period of the AC frequency of the voltage on the primary side. Furthermore, with such system, the auxiliary power consumers are not exposed to the respective over-/under-voltages, which significantly reduces the risk of component failure over the lifetime of the wind turbine, which is generally on the order to 25 years. The system in particular allows the use of standard components that are rated for the nominal operating voltage of the auxiliary system. The use of smaller and standardized components further results in a significant cost reduction.

Furthermore, the space requirements of the auxiliary power system are not significantly different from conventional auxiliary systems, so that no modification of the wind turbine nacelle is required. As the space available for a conventional auxiliary transformer can be used, the maintenance procedure can be retained and the existing power connections can be reused. Also, the electric system of the wind turbine does not need to be changed significantly. Accordingly, significant advantages may be achieved by the auxiliary power system.

In an embodiment, the on-load tap changer is provided on the primary side of the auxiliary transformer, i.e., the taps may be provided on a primary winding (i.e., no taps may be provided on the secondary side of the auxiliary transformer). This ensures a fast reaction and that the secondary side of the transformer is not exposed to over-voltages. It should be clear that the transformer winding, e.g., the primary winding, may comprise one or more winding parts that may as such be a winding arrangement. In other embodiments, taps may additionally or alternatively be provided on the secondary winding.

In an embodiment, the transformer is a three-phase transformer and has accordingly three primary transformer windings on the primary side and three secondary transformer windings on the secondary side, one being associated with each phase. An individual tap changer may then be provided for each winding on the respective side of the transformer (for example, if the tap changer is provided on the primary side, taps may be provided on the three primary windings of the transformer, and if the tap changer is provided on the secondary side, taps may be provided on each of the three secondary windings). The tap position and configuration is the same for each of the windings of the respective transformer side. Accordingly, any explanations given herein with respect to a transformer winding apply equally to the transformer windings of the further phases.

The three phase windings on the primary side of the transformer are connected in a delta connection, but may also be connected differently, e.g., star/wye. The three phase windings on the secondary side are star/wye connected (delta-wye transformer), but may also be connected differently, e.g., in a delta connection. A neutral wire from the star-point may be provided on the secondary side.

An over-voltage or under-voltage on the power grid will generally affect all three phases, so that over/under-voltage events can be compensated for the three phases. However, if the over/under-voltage is different between the phases, the tap changer may also compensate such unbalanced over-voltages, as the tap of each transformer winding for the respective phase may be controlled individually.

The tap changer may include for a transformer winding at least two, at least three, e.g., between 2 and 20 taps.

In some embodiments, the transformer winding, in particular the primary winding, may be one continuous winding to which the taps are connected. In other embodiments, the transformer winding may be split into a number of winding parts, e.g., 2, 3 or more parts. For example, the transformer winding may comprise at least a first winding part and a second winding part. The first winding part and the second winding part may be connectable in series (i.e., so that the current through the transformer winding passes through both winding parts). The first winding part and the second winding part may each be provided with respective semiconductor switches that are switchable to take one or more turns of the respective winding part out of the series connection. Each winding part can have one or more taps which, when they are connected by the associated semiconductor switch, take some or all turns of the winding part out of the circuit, i.e., result in that the current through the winding no longer flows through the respective turns. Such splitting of the winding has the advantage that with a fewer number of taps, a larger number of settings of the turns ratio of the transformer can be achieved. Furthermore, the voltage difference to which the semiconductor switches are exposed when they are open can be reduced.

In a particular configuration, the second winding part may be provided with semiconductor switches that are switchable such that the second winding part is taken out of the series connection, in particular completely taken out, i.e., such that all turns of the second winding part are taken out of the circuit or are connected into the circuit. The first winding part may have 2-5 taps, e.g., 3 taps. Six different transformer ratios may then be selected in such example (3 with the second winding part connected and 3 with the second winding part bypassed).

In an embodiment, the first winding part comprises a number of turns that is selected such that when the on-load tap changer is switched so that only the first winding part is connected in the respective transformer winding (i.e., the current through the transformer winding only flows through this first winding part, in particular through all turns of the first winding part, i.e., all turns are connected), the transformation ratio has a nominal ratio that provides a nominal auxiliary voltage on the secondary side of the transformer when a nominal operating voltage is provided on the primary side of the transformer. In other words, when the first winding part is fully energized, operation of the auxiliary transformer corresponds to the nominal operation at nominal operating voltages (i.e., the voltage on each side is 1 p.u., the reference being the nominal operating voltage on the respective side). The number of turns of the first winding (e.g., primary winding) and the number of turns of the winding of the respective other side (e.g., secondary winding) is accordingly selected to achieve the nominal turns ratio. In a typical system, the nominal operating voltage on the primary side may for example be 690 V, and on the secondary side, the nominal operating voltage may be 400 V, which are only exemplary values. The second part of the transformer winding may then provide additional turns, e.g., on the primary side. Accordingly, if the voltage on the primary side rises, the additional second winding part can be connected into the circuit in order to increase the turns number, thus stabilizing the voltage on the secondary side.

The second winding part may for example comprise between 3% and 70%, between 10% and 30%, between 20% and 30% of the number of turns of the first winding part. For example, it may comprise 25% or 27% of the number of turns of the first winding part, thus corresponding to a voltage change of 0.25 or 0.27 p.u.

For example, the second winding part may comprise a number of turns that is selected such that when a voltage on the primary side is at a voltage value selected from the range between 1.1 and 1.4 p.u., e.g., at 1.25 p.u., the voltage on the secondary side of the auxiliary transformer is at about nominal operating voltage.

As an example, a semiconductor switch may be provided and connected such that the two terminals of the second winding part are short-circuited by closing the switch, so as to bypass the second winding part. A further switch may then be provided between one of the terminals and the turns of the second winding part so that the short-circuit through the turns of the second winding part can be interrupted by opening this switch.

Other configurations are conceivable. The transformer winding may for example consist of a single winding comprising plural taps. In other configurations, the transformer winding may be split into two or more parts, and a first part of the transformer winding may be connectable to a second part of the transformer winding via a tap and an associated semiconductor switch of the electronic on-load tap changer.

Each of these semiconductor switches may be provided as a switching valve, in particular as two individual switches that are connected anti-parallel. The semiconductor switches may for example include power electronic switches, in particular thyristors. Accordingly, a semiconductor switch can contain or consist of two anti-parallel thyristors. It is also conceivable to employ light control semiconductor switches, for example light-triggered thyristors or light-activated electrically-triggered semiconductor switches. These are particularly useful at higher voltages, since the control circuit can be insulated efficiently from the higher voltages of the switching part. In other embodiments, different types of semiconductor switches may be used, for example IGBTs (insulated gate bipolar transistors), IGCTs (integrated gate-commutated thyristors), GTOs (gate turnoff thyristors), MOSFETs and SiC MOSFETs, e.g., in anti-serial or anti-parallel configuration so as to allow the switching of an AC current.

In some embodiments, a changeover impedance may be connected to at least some of the taps either directly or via a semiconductor switch associated with the respective tap. The changeover impedances may be arranged such that during a tap change from a first tap to a second tap, a short-circuit current between the first tap and the second tap passes through at least one changeover impedance. For example, every second tap may be provided with a changeover impedance, or each tap may be provided with a changeover impedance. The short-circuit currents during tap changing may thus be limited efficiently. In other embodiments, no changeover impedances are provided. The changeover impedance may for example be provided in form of a resistor or inductor.

In an embodiment, for at least a part of the transformer winding, each tap of the part of the transformer winding is directly connected to one side of an associated semiconductor switch, wherein the other sides of the semiconductor switches connected to the taps of the part of the transformer winding are directly connected together. Accordingly, no intervening changeover impedances are provided in such configuration. The assembly is thereby simplified and losses may be reduced. The tap changer may for example be configured to employ a changeover method that limits the short-circuit currents when switching between such taps without changeover impedance. For example, a fast switching may be provided.

When performing a tap change, switching may occur at a zero crossing of the voltage and/or current that is being switched. Electrical stresses during tap changes may thus be limited efficiently.

It should be clear that also configurations are conceivable in which some taps are connected together via their respective semiconductor switches without using any changeover impedances, while other taps may employ changeover impedances.

In an embodiment, the auxiliary power system further comprises a controller, which may be the controller mentioned above, configured to monitor a voltage on a primary side and/or on a secondary side of the auxiliary transformer and to control a tap setting of the tap changer in accordance with the monitored voltage. The controller may thus be capable of detecting voltage variations on the primary side (which are also experienced on the secondary side), and to effectively compensate such voltage variations by changing the tap setting. It should be clear that the monitoring may be performed for each phase of a three-phase system, and that the tap setting may be controlled individually for each phase.

The controller may be configured to perform the tap changing within less than five periods of the primary voltage, within less than three or less than two periods. For example, for a 50 Hz power grid (i.e., 50 Hz power generating system), the tap changing may occur within less than 40 ms (two periods). The controller may for example monitor a signal from a respective voltage sensor, and the auxiliary power system may comprise a respective voltage sensor, e.g., one sensor for each phase on the primary and/or the secondary side. Additionally or alternatively, the controller may receive a signal indicative of the monitored voltage, for example from another controller of the wind turbine, such as a converter controller that monitors the voltage on the primary side of the auxiliary transformer, for example on the low-voltage side of the wind turbine power generating system. The controller may accordingly measure the respective voltage and/or receive a signal indicative of the monitored voltage.

The controller may be configured to change the tap setting such that the voltage on the secondary side of the auxiliary transformer is maintained between predefined limits. Such predefined limits may for example correspond to the operating limits of the components of the auxiliary power system, such as ±10% of the nominal operating voltage. The range within which the secondary side voltage is maintained may for example be selected from the range between ±4% to ±15% of the nominal operating voltage.

As an example, at least the voltage on the primary side is monitored and the controller is configured to change the tap setting upon the voltage on the primary side of the auxiliary transformer reaching a respective threshold value to thereby adjust the voltage on the secondary side, i.e., to compensate for the voltage variation. For example, plural respective threshold values may be defined above and below the nominal operating voltage for the primary side, which are selected such that the voltage on the secondary side is kept within respective predefined limits. As an example, if the voltage on the secondary side is to be kept within ±10% of the nominal voltage, thresholds may be defined for the primary voltage at ±10%, ±20% and ±30% of the nominal operating voltage on the primary side. The tap changer and the primary winding would then be provided with a respective number of taps and additional turns, e.g., by providing an additional winding part. If the primary voltage reaches or exceeds the +10% threshold, the winding number is increased by 10% by a respective tap change so that the voltage on the secondary side is again brought down to the nominal voltage. If the primary voltage exceeds +20%, the controller selects a tap that increases the turns number in total by 20%, again compensating for the voltage variation. Likewise, the controller selects a tap that reduces the turns number if the voltage on the primary side drops again below the respective thresholds, or drops below lower thresholds in an under-voltage condition.

For example, plural threshold values may be defined for the primary voltage in a voltage range between 0.5 and 1.5 p.u. of the primary voltage, between 0.7 and 1.3 p.u. At least two threshold values may be provided above and two threshold values below the nominal operating voltage. The voltage threshold values may be selected in accordance with the available tab settings. It should be clear that a different number of thresholds may be employed above and below the nominal operating voltage, and that different threshold values may be defined for a rising and a falling voltage. In general, the thresholds will be selected based on the available tap settings, the expected voltage variations on the primary side and the voltage limits within which the voltage on the secondary side is to be kept. For example, if the voltage varies significantly on the primary side, and is to be kept within small limits on the secondary side, a higher number of taps and a higher number of thresholds may be required.

In another embodiment, at least the voltage on the secondary side is monitored and the controller is configured to change the tap setting upon the voltage on the secondary side of the auxiliary transformer reaching or exceeding an upper or lower threshold value to thereby maintain the voltage on the secondary side between the upper and lower threshold values. For example, if the voltage on the primary side rises or falls, the voltage on the secondary side will reach the upper/lower threshold, upon which the tap is changed so that the voltage on the secondary side remains within the range defined by the upper/lower thresholds. In a rising voltage condition on the primary side, the upper threshold will thus be reached repeatedly, each time resulting in a respective tap change.

The upper threshold value may for example be selected from a range between 2% and 20% above the nominal operating voltage on the secondary side, and the lower threshold value may be selected from a range between 2% and 20% below the nominal operating voltage. In an embodiment, the threshold values are about ±10% of the nominal operating voltage (i.e., at about 1.1 and 0.9 p.u.).

The controller 40 may be provided as a separate and a distinct (e.g., autonomous) controller that is configured to control the tap changer in dependence on the monitored voltage. The controller may comprise a respective driver for driving the semiconductor switches, in particular a thyristor driver. It may further comprise a measuring unit for performing respective voltage measurements on the primary and/or secondary side of the auxiliary transformer.

In an embodiment, the controller may be configured to implement a startup function, e.g., a startup circuit, which controls the tap changer during a start-up phase of the wind turbine to operate the transformer at a nominal transformation ratio, e.g., to disable the tap changing. Interference of the tap changing with changing voltage levels during such start-up may thus be avoided. The tap changer may for example be disabled (if the transformer operates at nominal ratio without tap changer), or the respective tap(s) of the tap changer may be closed to achieve the desired nominal transformation ratio.

The auxiliary power system, and optionally the auxiliary consumers may be configured to be arranged in a nacelle of a wind turbine. In particular, the wind turbine auxiliary power system may be comprised in a wind turbine.

According to a further embodiment of the invention, a wind turbine is provided, wherein the wind turbine comprises an electrical power generating system configured to generate electrical power from rotational mechanical energy. Such electrical power generating system may for example include a generator, a converter and a wind turbine transformer, e.g., in a DFIG topology or a full converter topology. The wind turbine further comprises an auxiliary power system having any of the configurations described herein. The auxiliary power system, in particular the primary side of the auxiliary transformer, is coupled, in particular connected, to the electrical power generating system, for example to a position between the converter and the wind turbine transformer. By such wind turbine, similar advantages as the ones outlined further above may be achieved.

According to a further embodiment of the invention, a method of operating an auxiliary power system of a wind turbine is provided. The auxiliary power system is configured to receive electrical power from an electrical power generating system of the wind turbine or from a power grid, wherein the auxiliary power system comprises an auxiliary transformer having a primary side configured to be coupled to the electrical power generating system of the wind turbine and a secondary side configured to be coupled to auxiliary power consumers of the wind turbine and to provide transformed electrical power to the auxiliary power consumers. It further comprises an electronic on-load tap changer provided on the auxiliary transformer, wherein the electronic on-load tap changer comprises taps on at least one transformer winding of the auxiliary transformer and semiconductor switches that are coupled to the taps. In embodiments, the method comprises adjusting the transformation ratio of the auxiliary transformer by controlling the semiconductor switches of the electronic on-load tap changer to compensate for voltage variations on the primary side of the auxiliary transformer. In an embodiment, the adjusting is performed while the wind turbine is coupled to the power grid. By such method, advantages similar to the ones described above with respect to the auxiliary power system may be achieved. In embodiments, the method may be performed by the auxiliary power system having any of the configurations described herein. In embodiments, the method may include any of the method steps described herein with respect to the auxiliary power system. The auxiliary power system may be configured to perform any of these method steps.

It is to be understood that the features mentioned above and those yet to be explained below can be used not only in the respective combinations indicated, but also in other combinations or in isolation, without leaving the scope of embodiments of the present invention. In particular, the features of the different aspects and embodiments of the invention can be combined with each other unless noted to the contrary.

BRIEF DESCRIPTION

Some of the embodiments will be described in detail, with reference to the following figures, wherein like designations denote like members, wherein.

DETAILED DESCRIPTION

Figure 1:
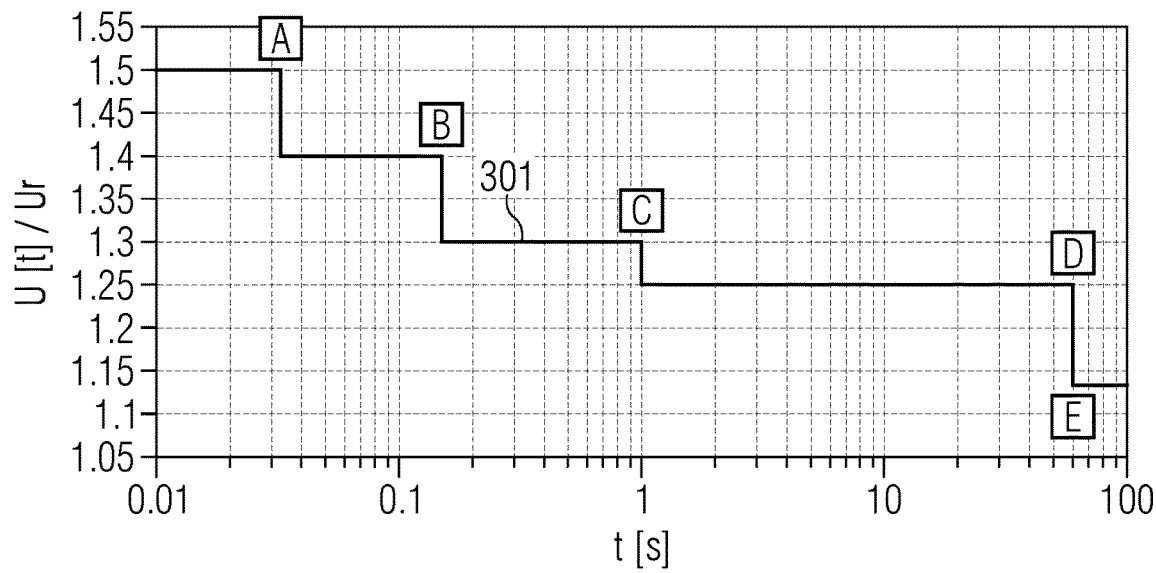
FIG. 1 is a schematic diagram illustrating grid code requirements in form of a high voltage ride through (HVRT)-envelope.

In the following, embodiments of the invention will be described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the art. As used herein, the singular forms "a," "an," and "the" are intended to include the plural forms as well, unless the context clearly indicates otherwise. The terms "comprising," "having," "including," and "containing" are to be construed as open-ended terms (i.e., meaning "including, but not limited to,") unless otherwise noted.

Figure 2:
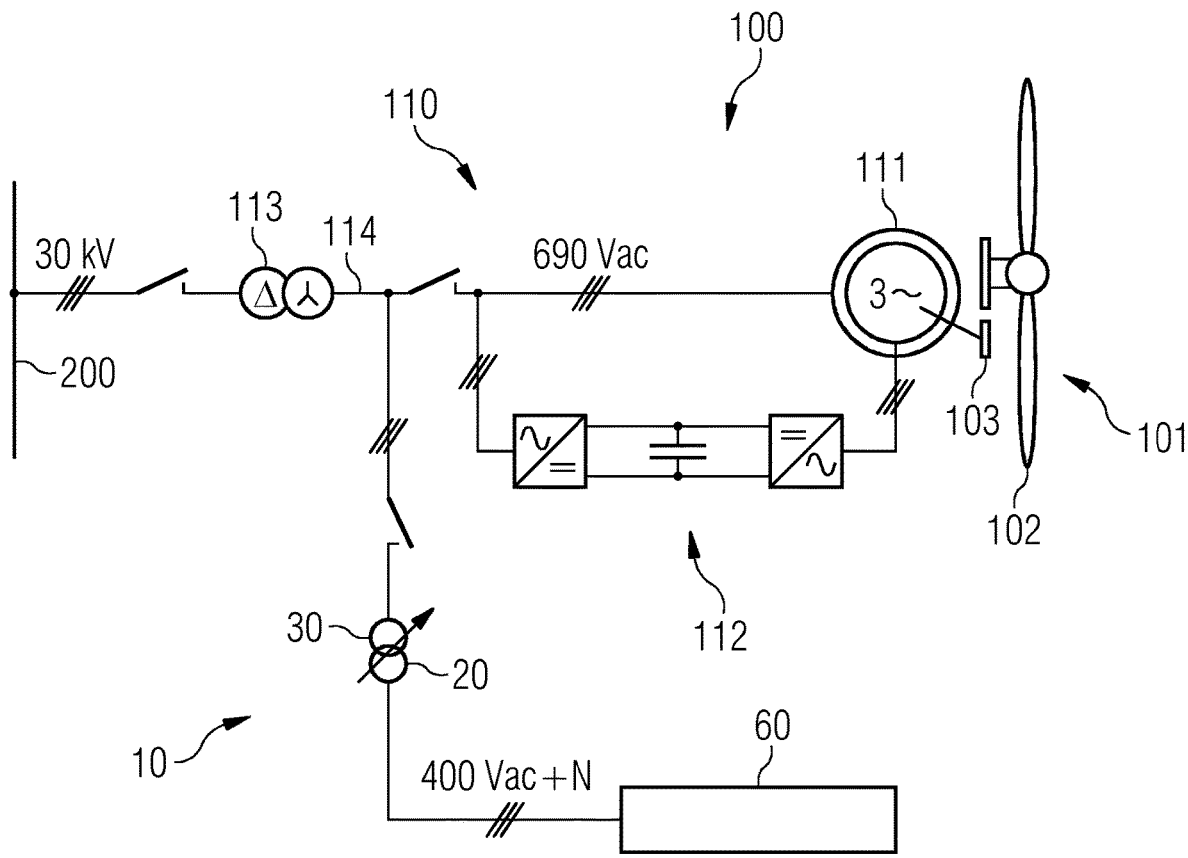
FIG. 2 is a schematic drawing showing a wind turbine including an auxiliary power system according to an embodiment of the invention.

FIG. 2 illustrates a wind turbine 100 according to an embodiment that comprises a rotor 101 with rotor blades 102 that transform wind energy into rotational mechanical energy. It further includes an electrical power generating system 110 with a generator 111 that receives the rotational mechanical energy via a gearbox 103. The electrical power generating system 110 further includes a converter 112 and a wind turbine transformer 113 that is coupled to a power grid 200. Power grid 200 may be a wind farm grid or a utility grid. In the configuration of FIG. 2, the generator 111 is a doubly-fed induction generator (DFIG) the stator of which is connected to wind turbine transformer 113 and the rotor of which is connected to the power converter 112. Such DFIG topologies are known in the conventional art and will not be explained in greater detail here. The wind turbine 100 may alternatively comprise a full converter topology in which the generator is coupled to the transformer via a full power converter that converts essentially all the power generated by the generator. In such topology, the generator may for example be a permanent magnet synchronous generator or the like. The wind turbine 100 may also be a direct drive wind turbine that does not include a gearbox 103. As indicated in FIG. 2, the system is a three-phase system including three phases of AC electrical power.

An auxiliary power system 10 is coupled to the electrical power generating system 110. In particular, it is connected between the converter 112 and the transformer 113 and/or the generator 111 and the transformer 113. The auxiliary power system 10 can receive electrical power from the low-voltage (LV) side of the wind turbine. Low-voltage generally refers to voltages up to 1000 V, a typical value being 690 V as indicated in FIG. 2. It should be clear that the coupling of auxiliary power system 10 can occur correspondingly in a full converter topology. The voltage on the power grid can for example be a medium voltage, the term medium voltage generally referring to a voltage range of 1000 V to 50.000 V, wherein a value of 30.000 V is exemplarily indicated in FIG. 2. The auxiliary power system is thus essentially connected to the secondary side (low-voltage side) of wind turbine transformer 113. It should be clear that the auxiliary power system 10 can be supplied with electrical power either from the generator 111 or from the power grid 200 (for example when starting-up the wind turbine).

The auxiliary power system 10 supplies electrical power to auxiliary consumers or loads 60. Such auxiliary consumers may be for example be a cooling system (including pumps, controllers and the like), a lubrication system including respective lubrication pumps, controllers, sensors, drives such as an electrical yaw drive or electrical pitch drives and the like. The auxiliary power system 10 can include a distribution system that distributes the electrical power to the respective consumers.

The auxiliary power system includes an auxiliary transformer 20 having a primary side that is connected to the electrical power generating system 110, in particular to the low voltage (LV) side 114 of the power generating system 110, and a secondary side to which the power consumers 60 are coupled. It should be clear that connections and couplings may include protective elements, such as the circuit breakers shown in FIG. 2, or filters, which are not explained in further detail here.

The auxiliary power system 10 further includes a tap changer 30 that comprises taps on the primary and/or secondary side of the auxiliary transformer 20. The tap changer 30 allows the adjustment of the turns ratio of the auxiliary power transformer 20 by bypassing turns of the respective transformer winding or by adding additional turns to the winding. For this purpose, the tap changer 30 comprises semiconductor switches that are connected to the respective taps.

The transformation ratio of a transformer is generally given as the number of turns on the primary side $N_P$ divided by the number of turns on the secondary side $N_S$, wherein the turns ratio corresponds to the ratio of the voltage on the primary side $V_P$ to the voltage on the secondary side $V_S$:

$$V_P/V_S = N_P/N_S \quad \text{(Equation 1)}$$

so that the voltage on the secondary side is $$V_S = V_P * N_S/N_P \quad \text{(Equation 2)}$$

Accordingly, if the voltage on the primary side rises, the number of turns on the primary side can be increased to compensate for such variation and to keep the voltage on the secondary side stable. Likewise, if the voltage on the primary side drops, the number of turns on the primary side can be reduced to keep $V_S$ stable. It should be clear that analogously, the number of turns on the secondary side may be changed, or both, the number of turns on the primary and on the secondary side may be adjusted. It is however desired to provide the tap changer 30 on the primary side of the transformer and thus to adjust $N_P$.

The auxiliary power system 10 is in particular configured such that voltage variations on the primary side of auxiliary transformer 20 are compensated by respective tap changes. Such voltage variation can for example occur as a result of a grid event. If there is a grid fault, a voltage drop may result on the power grid 200, which is experienced on the low-voltage side 114 of the wind turbine, as it is passed on by the wind turbine transformer 113. The same happens upon occurrence of an over-voltage condition on power grid 200. The auxiliary power system 10 including the tap changer 30 now allows the voltage on the secondary side of auxiliary transformer 20 to be kept within predefined limits by corresponding tap changes. Consequently, the auxiliary power consumers 60 only experience very slight voltage variations that are mainly determined by the available number of taps of tap changer 30 and thus the granularity with which the turns number can be switched (i.e., the voltage variations can be compensated).

Auxiliary power loads 60 do accordingly not need to be over-sized and to not need to be provided with a higher insulation level in order to be able to operate at over-/under-voltage conditions occurring on power grid 200. This results in respective cost and space savings. In particular, it should be clear that the auxiliary power system 10 and the auxiliary consumers 60 are generally arranged inside the nacelle of wind turbine 100, in which space is limited.

Figure 3:
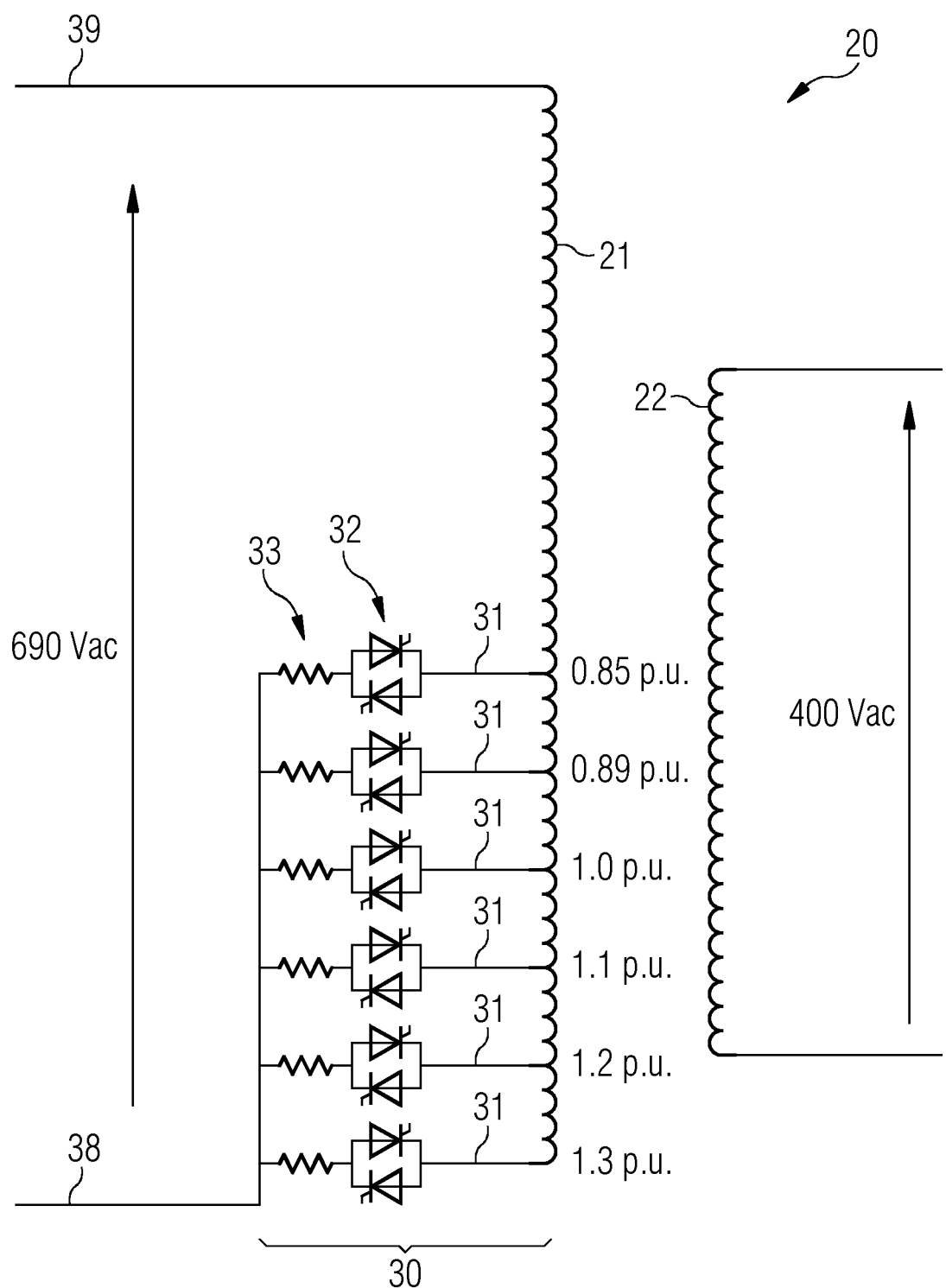
FIG. 3 is a schematic drawing showing an auxiliary power system according to an embodiment of the invention.

FIG. 3 shows an exemplary implementation of the auxiliary transformer 20 and the tap changer 30. The auxiliary transformer 20 includes on the primary side the primary winding 21 and on the secondary side the secondary winding 22. It should be clear that a respective winding may be provided for each phase of the transformer.

The primary side may thus include three primary windings 21, which can be connected in a delta or other configuration, and three secondary windings 22 on the secondary side which may be connected in a star (wye) or other configuration. Each of the three windings on the respective side of the transformer may be provided with a respective individual tap changer, wherein these tap changers can have the same configuration.

In the example of FIG. 3, 6 taps are provided on the primary winding 21, although it should be clear that a different number of taps, such as 2, 3, 4, 5, 7 or even more taps may be provided, e.g., between 2 and 20 taps. To each tap 31, a respective semiconductor switch 32 is connected.

By closing the semiconductor switch 32, the associated tap 31 is connected to the respective terminal 38 of the transformer winding 21. When changing taps, the semiconductor switch of the new tap is first closed, and the semiconductor switch of the old tap is opened thereafter. Accordingly, the power supply to the auxiliary consumers 60 is not interrupted. During the tap change, short-circuit currents occur, since both ends of the turns that are connected between the new and old taps are short-circuited. Change-over impedances 33, in particular resistances, can be coupled to each tap 31 to limit these short-circuit currents. The changeover impedance 33 can be connected between the respective tap 31 and the semiconductor switch 32, or can be connected behind the semiconductor switch 32, as illustrated in FIG. 3. In other embodiments, no respective changeover impedances 33 may be provided. A tap change may then occur according to a control scheme that minimizes the short-circuit current during tap changes.

The number of turns of the primary winding 21 between two adjacent taps may be the same for all taps, or the turn number may be set differently. FIG. 3 indicates for each tap the respective voltage on the primary side of the transformer (in p.u.) that results in the nominal voltage (1 p.u.) on the secondary side. Accordingly, during normal operation, the tap indicated as 1.0 p.u. is closed (primary voltage 1 p.u. and secondary voltage 1 p.u.). If the primary voltage is 1.1 p.u. and the respective tap is connected by closing the associated switch, a voltage of 1 p.u. results on the secondary side. Accordingly, when the primary voltage rises, the taps can be changed subsequently to compensate these voltage changes and to stabilize the voltage on the secondary side. In the example of FIG. 3, 1 p.u. on the primary side corresponds to 690 V AC, and 1 p.u. on the secondary side corresponds to 400 V AC. It should be clear that these are only exemplary values and that these voltages may be changed in accordance with the requirements and the type and model of wind turbine.

With the example of FIG. 3, both over- and under-voltage on the primary side can be compensated. It should be clear that in other configurations, only over-voltages or only under-voltages may be compensated, so that only taps for voltages of more than 1 p.u., or taps for voltages of less of 1 p.u. may be provided. Also, it should be clear that the tap changer 30 can likewise be provided on the secondary side, i.e., the taps may be provided on secondary winding 22.

Tap changer 30 is an on-load tap changer, meaning that the taps are changed while the primary winding 21 is energized, i.e., during operation and without interrupting the flow of electrical power. Accordingly, power supply to the auxiliary consumers 60 is not interrupted.

Tap changer 30 is an electronic tap changer that makes use of semiconductor switches 32 for tap changing. Semiconductor switches 32 can be implemented with power electronics, and each switch 32 may include a pair of anti-parallel connected power semiconductors. A semiconductor switch 32 may thus also be designated as switching valve. In an embodiment, two anti-parallel connected thyristors are used for implementing the semiconductor switch 32. Other types of power electronic switches may be employed as well, such as IGBTs, MOSFETs, or the like.

Figure 4:
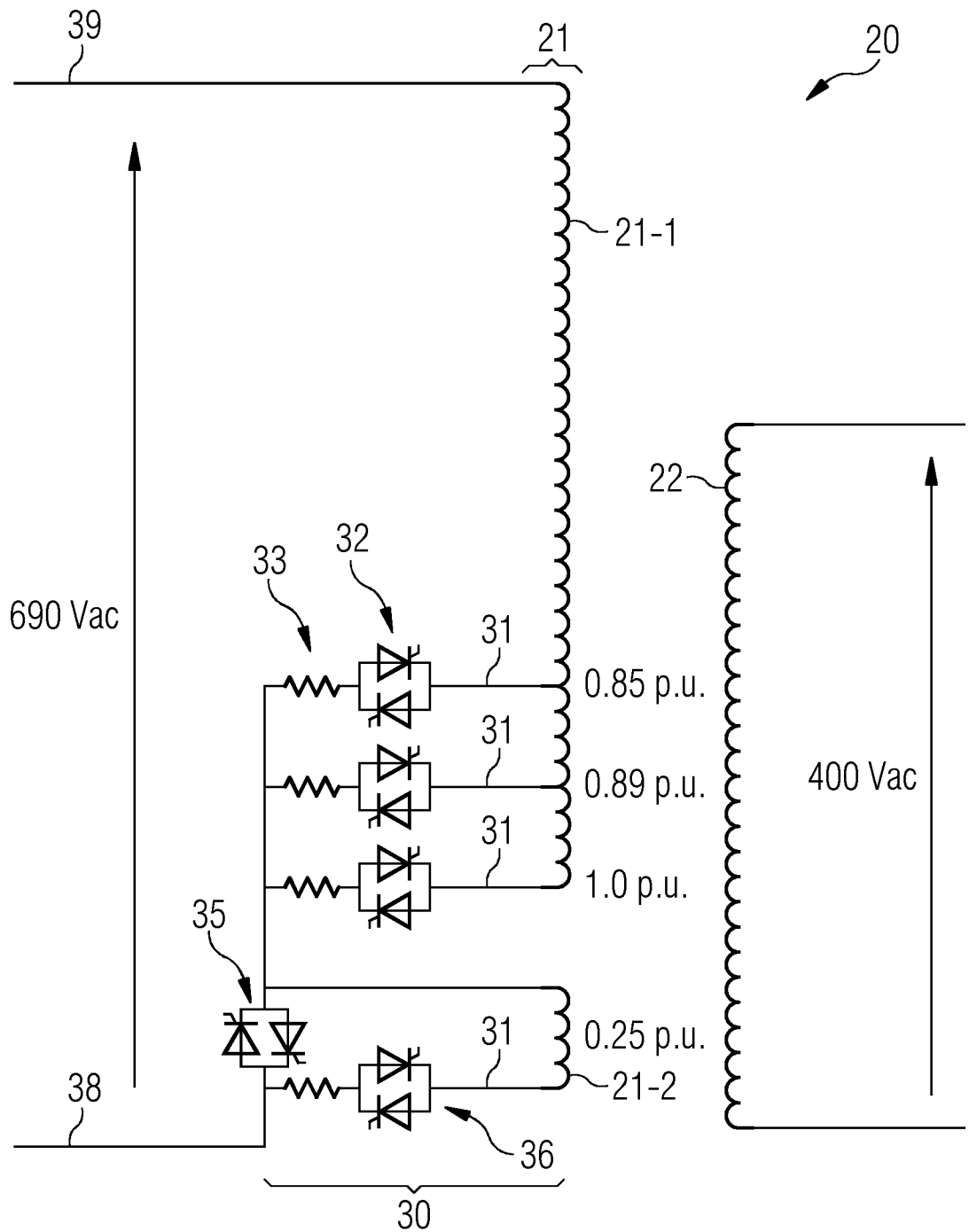
FIG. 4 is a schematic drawing showing an auxiliary power system according to an embodiment of the invention.

FIG. 4 illustrates a further embodiment of the auxiliary power system 10 including the auxiliary transformer 20 and the tap changer 30. As this embodiment is a modification, the above explanations provided with respect to FIGS. 2 and 3 are equally applicable to the embodiment of FIG. 4, and the auxiliary power system 10 of FIG. 2 may be implemented as shown in FIG. 4.

In the example of FIG. 4, the primary winding 21 includes a first winding part 21-1 and a second winding part 21-2. The first winding part 21-1 is provided with a number of taps (three taps), wherein the last tap corresponds to 1 p.u., i.e., to a nominal transformer ratio at which the auxiliary transformer 20 operates with nominal voltages on the primary and the secondary side. The second winding part 21-2 is provided as an additional winding that can be connected in series with the first winding part 21-1 by using respective semiconductor switches. The second winding part 21-2 in particular comprises two terminals that can be short-circuited via the semiconductor switch 35. Accordingly, by closing the semiconductor switch 35, the second winding part 21-2 is bypassed and thus taken out of the circuit. Between one of the terminals and the turns of the second winding part 21-2, a further semiconductor switch 36 is provided. When the second winding part 21-2 is bypassed, the second semiconductor switch 36 is opened to interrupt short-circuit currents through the second winding part 21-2. During normal operation, (at nominal voltages), switch 35 is closed and switch 36 is opened, so that the additional winding part is bypassed. If the voltage on the primary side of transformer 20 rises, the second winding part 21-2 is connected in series with the first winding part between terminals 38 and 39 by first closing switch 36 and then opening switch 35. To bypass the second winding part again, the switch 35 is first closed and switch 36 is opened thereafter. An on-load tap change without interruption of the power supply can thus be realized.

The additional number of turns of the second winding part 21-2 corresponds in the example of FIG. 4 to 0.25 p.u., i.e., it comprises one quarter of the number of turns of the first winding part 21-1. If the voltage rises on the primary side to 1.25 p.u., the second winding part 21-2 can be connected into the circuit, thus providing nominal voltage on the secondary side. However, if the voltage on the primary side rises to a lower value, a tap may additionally be changed on the first winding part 21-1 to achieve intermediate compensation values. For example, if the tap on the first winding part is switched to 0.89 p.u. and if the second winding part is included in the circuit, a voltage of 1.14 p.u. on the primary side would result in the nominal operating voltage on the secondary side of the transformer.

It should be clear that to exactly compensate each possible voltage value on the primary side such that the nominal voltage results on a secondary side, an infinite number of taps would be required. Accordingly, the voltage on the secondary side of the transformer is allowed to vary between predefined limits that depend on the number of taps available on the primary side. In an embodiment, the tap number (including the number of additional winding parts) is selected such that for the expected voltage variations on the primary side, the voltage variation on the secondary side is kept to within ±15%, to within ±10% on the secondary side. The value of the voltage variation on the secondary side in either positive or negative direction may for example be selected from the range of 1% to 20%, 4% to 15%.

Figure 5:
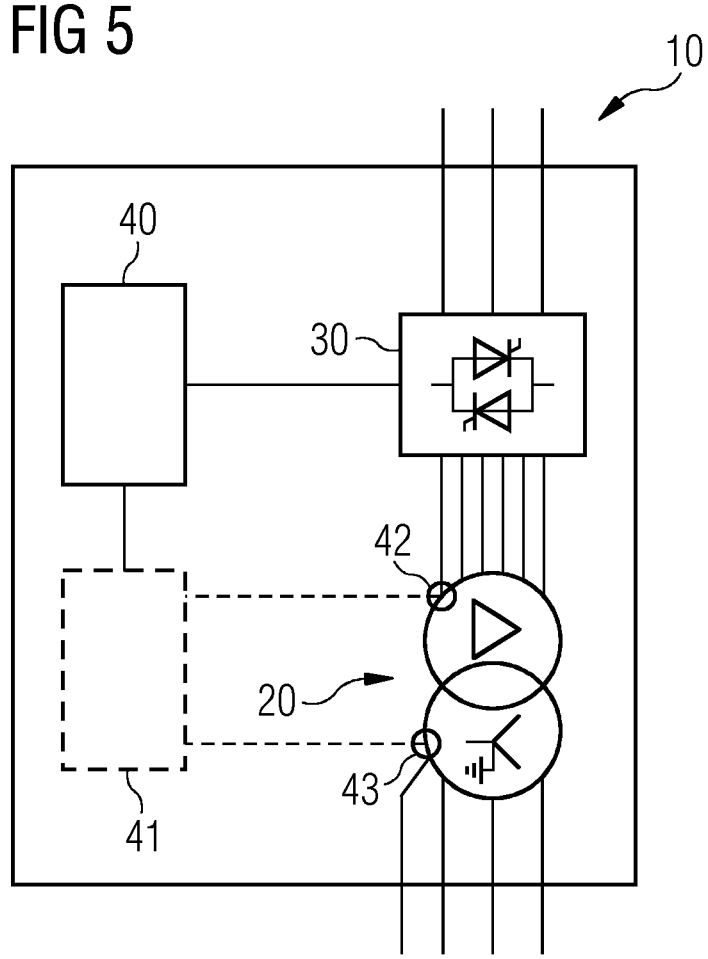
FIG. 5 is a schematic drawing showing an auxiliary power system according to an embodiment of the invention.

The auxiliary power system 10 may furthermore comprise a controller 40 for controlling the changing of the taps of tap changer 30. The configuration of such controller illustrated in FIG. 5 may be implemented in any of the configurations of FIGS. 2 to 4, and the above explanations also apply to the embodiment of FIG. 5. FIG. 5 shows that the auxiliary power system 10 is a three-phase system, wherein the primary windings of auxiliary transformer 20 are connected in a delta configuration and the secondary windings in a star configuration with a neutral take-off at the star point (such neutral take-off N also being indicated in FIG. 2). The respective taps and associated switches are provided for each of the three primary windings, although they may additionally or alternatively be provided for the secondary windings. Controller 40 may include a driver to drive the semiconductor switches, in particular the switching valves. Respective control signals are provided to the gates of the power electronic switches. The controller 40 performs the control on the basis of a monitored voltage. In particular, the controller 40 is configured to monitor the voltage on the primary and/or the secondary side of the transformer 20. Controller may receive respective monitoring signals from a measuring unit 41. Alternatively, it may include a connection to another controller of the wind turbine, in particular of the electrical power generating system 10, such as a converter controller of the converter 112. The converter controller may for example make measurements on the low-voltage side 114 of the power generating system 110 and these may be provided to and received by controller 40.

In an embodiment, the controller 40 includes the measuring unit 41 that receives the measurement signals from sensor 42 and/or sensor 43 that measures the voltages on the primary or secondary side of transformer 20, respectively. The auxiliary power system 10 may comprise the respective sensors 42 and/or 43.

For either of the monitored voltages, the controller 40 may employ respective upper and lower thresholds and may change the tap upon the monitored voltage reaching or exceeding the respective threshold.

Figure 6:
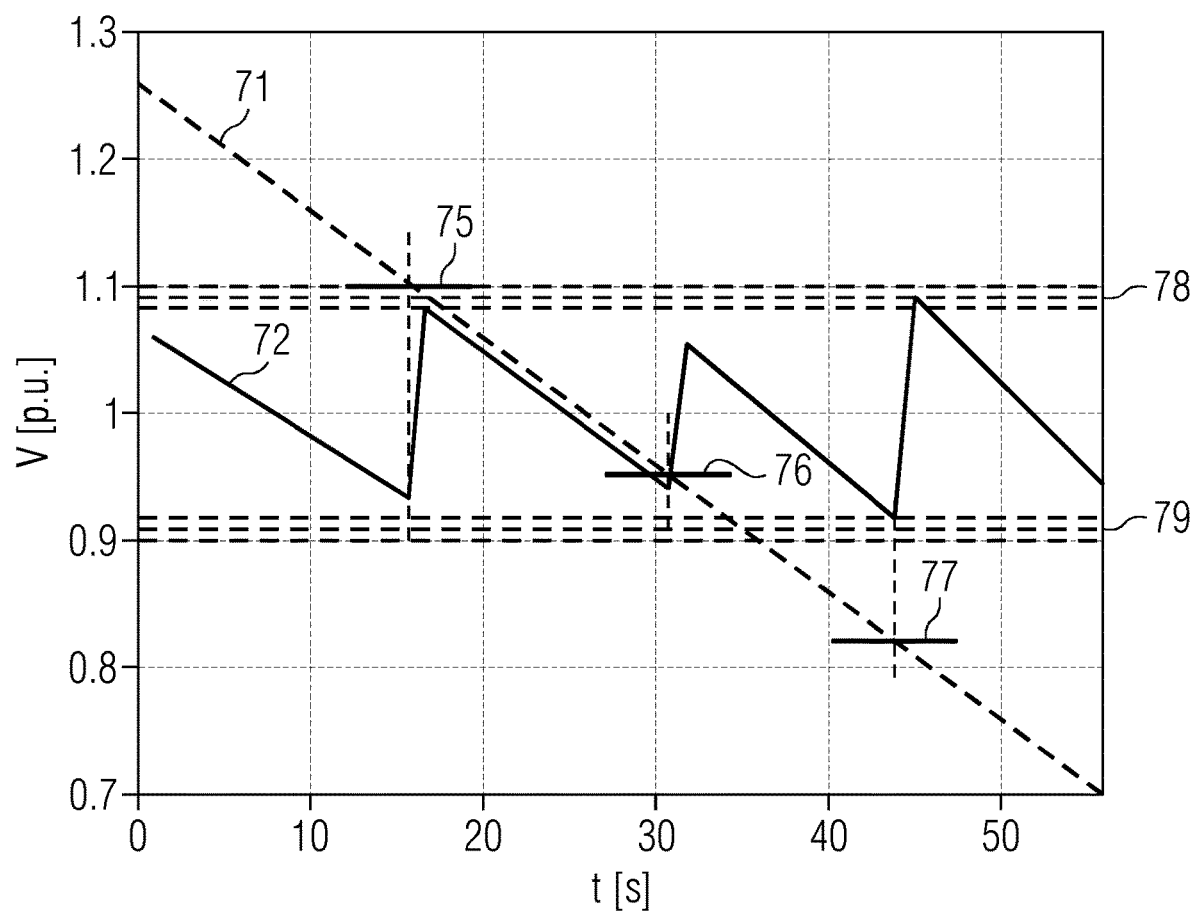
FIG. 6 is a schematic diagram illustrating a reduction of the voltage variation on the secondary side of the auxiliary transformer upon a voltage variation on the primary side of the transformer.

An example of such thresholds is illustrated in FIG. 6. FIG. 6 shows the primary voltage (dashed line 71) and the secondary voltage (solid line 72) each in units of p.u. (with the respective nominal voltage as reference value) over time t. As can be seen in the example, the primary voltage drops from 1.25 p.u. (over-voltage) to 0.7 p.u. (under-voltage). FIG. 6 illustrates an upper threshold 75 and lower thresholds 76 and 77 for the voltage on the primary side of transformer 20. Control unit 40 monitors this primary voltage 71 and changes the tap upon the primary voltage reaching the respective threshold. The thresholds are selected such that a corresponding tap change keeps the voltage on the secondary side (line 72) between predefined voltage limits that are indicated by dashed horizontal lines. As can be seen, as the primary voltage drops, the secondary voltage follows proportionally. Upon reaching the threshold 75, the controller 40 changes the tap by decreasing the number of turns connected between the terminals of the primary windings, whereupon the secondary voltage rises again (see equations 1 and 2). The secondary voltage then again continues to drop in correspondence to the primary voltage. Upon the primary voltage reaching the threshold 76, the tap changer again changes the tap by reducing the number of turns that are connected in the primary winding circuit. Accordingly, the secondary voltage rises again. Both voltages drop again until the primary voltage reaches the threshold 77, upon which the controller 40 causes a further tap change. This causes the secondary voltage to rise again, thus keeping the secondary voltage within the predefined voltage limits.

It should be clear that similar thresholds or the same thresholds may be employed when the voltage is rising, wherein the controller causes the tap changer to increase the number of energized turns of the primary winding if the primary voltage rises above the respective threshold. Furthermore, it should be clear that FIG. 6 only shows one exemplary implementation, and that the number of thresholds and the location of the thresholds will generally be selected in dependence on the particular application, in particular on the number of available taps and on the range of primary voltage variation that is to be compensated. For example, further thresholds may be provided at higher primary voltages, such as 1.25 p.u. and 1.3 p.u. It should further be clear that the thresholds do not need to be spaced equidistantly. Rather, the number of turns that are switched by respective taps and the corresponding thresholds can be chosen in accordance with the respective application, for example to achieve lower-voltage variations about the nominal operating voltage by implementing a finer granularity of possible tap changes and accordingly more thresholds for the primary voltage.

It should further be clear that the controller 40 may likewise implement thresholds for the secondary voltage, such as thresholds 78 or 79 illustrated in FIG. 6, and may cause a tap change if the secondary voltage reaches the respective threshold. In the example of FIG. 6, each time that during the dropping of the primary voltage, the secondary voltage reaches the lower threshold 79, the tap may be changed by decreasing the number of turns of the primary winding that are connected in the circuit (energized turns). This is repeated each time that the secondary voltage reaches the lower threshold 79. Likewise, for a rising primary voltage, the tap is changed each time that the secondary voltage reaches the upper threshold 78.

Combinations are likewise conceivable in which thresholds are set both for the primary and the secondary voltage, and the tap change occurs each time that a respective threshold is reached or exceeded. The reliability of the system may thus be improved, for example in situations in which one voltage measurement becomes unavailable.

Turning back to FIG. 5, the controller 40 is configured to perform the tap change within a short period of time, within less than 500 ms. For example, the tap change may occur in less than five periods of the AC voltage on the primary side, which typically has a frequency of 50 or 60 Hz. In an embodiment, the tap change occurs in less than three or two periods, for example within less than 40 ms. By such fast tap changing, the voltage on the secondary side of the transformer 20 can efficiently be kept between respective voltage limits. Furthermore, the short-circuit currents occurring during a tap change can be limited by such fast switching.

In an embodiment, the switching occurs during a zero crossing of the voltage and/or of the current on the respective transformer side where the tape change occurs. The currents that need to be switched by the semiconductor switches may thus be kept relatively low.

In an embodiment, the controller 40 is a separate and distinct, independent controller. It may in particular be an autonomous controller that is independent of other controllers of the wind turbine. The auxiliary power system 10 can thus be installed in the wind turbine without requiring any modifications to other wind turbine systems. The controller 40 may include a processor, in particular a microprocessor, an ASIC, a DSP or the like and may further comprise a memory, such as RAM, ROM, Flash-Memory, a hard-disk drive or the like. The memory may store control instructions which when executed by the processor of controller 40 perform any of the control methods described herein. It may comprise further components common to such type of controller, such as input/output interfaces for receiving the monitored values and for outputting control signals towards the semiconductor switches.

In an embodiment, a startup function may furthermore be provided. Such startup (or auto-start) function may be implemented in the controller 40, e.g., as a startup-circuit. The controller 40 is then configured to disable the tap changing during a start-up phase and may operate the transformer with a nominal transformation ratio, e.g., by closing the switch associated with the 1.0 p.u. tap and opening the switches for the other taps. In the configuration of FIG. 4, the switch 35 will of course also be closed. During the start-up phase, the auxiliary transformer 20 thus behaves similar to a conventional auxiliary transformer, so that the conventional start-up procedures can be performed. The start-up phase may end when the wind turbine commences normal operation. After end of the start-up phase, the controller 40 enables the tap changing via tap changer 30 as described herein. The controller 40 may for example detect the start-up of the wind turbine by receiving a respective start command, by detecting that the controller 40 has just been started up, by detecting a switching on of a power supply or any other conceivable measures. The auxiliary transformer 20 can thus be integrated seamlessly into an existing conventional power system of a wind turbine and can operate the usual way during start-up.

Figure 7:
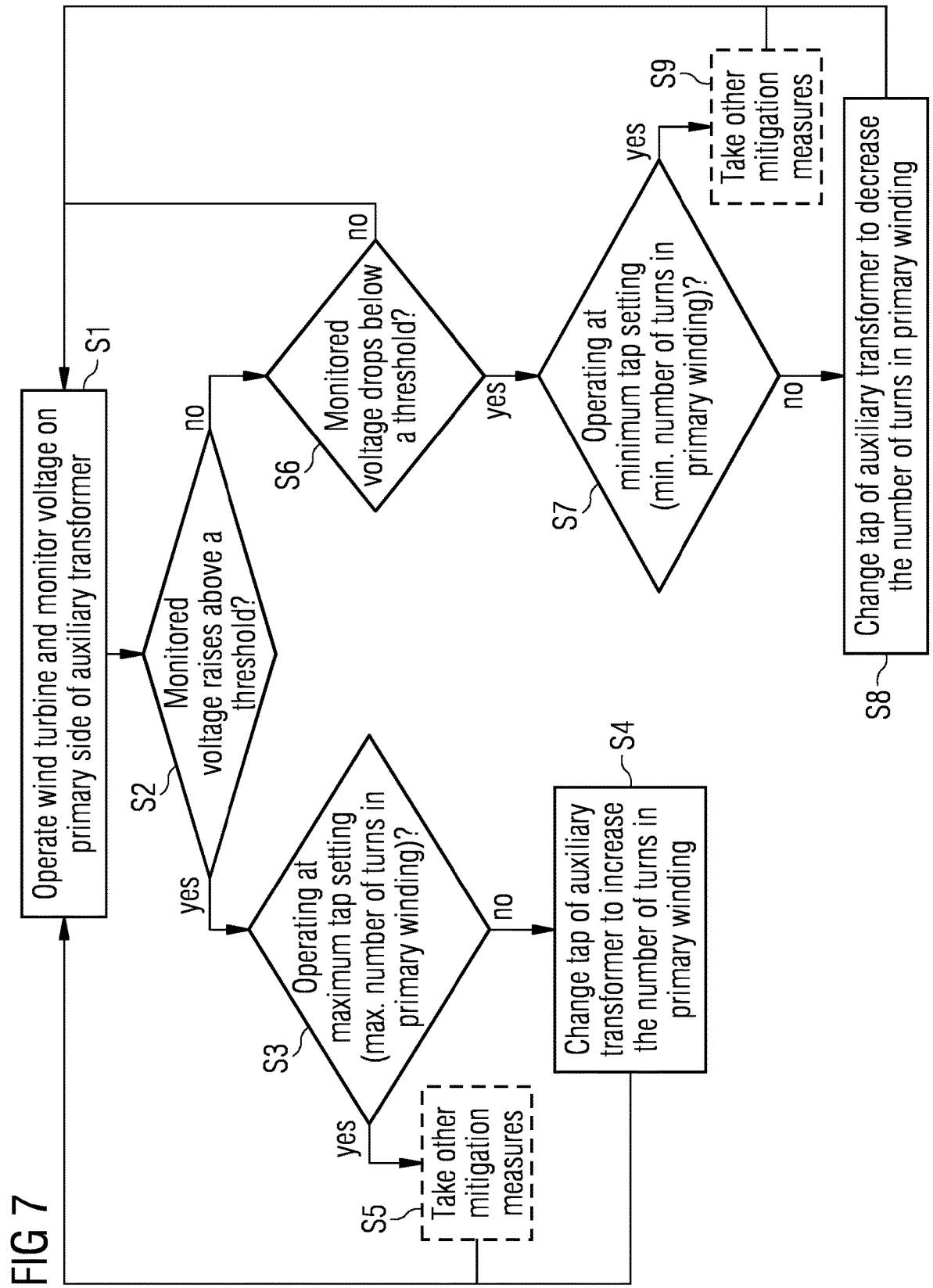
FIG. 7 is a schematic flow diagram illustrating a method of operating an auxiliary power system according to an embodiment of the invention.

FIG. 7 illustrates an exemplary embodiment of a method of operating the auxiliary power system 10. In embodiments, the method may be performed by the auxiliary power system 10 in any of the above-described configurations, and the auxiliary power system 10 may be configured to perform the method illustrated in FIG. 7.

In step S1, the wind turbine is operated and the voltage on the primary side of the auxiliary transformer 20 is monitored, e.g., via measuring unit 41 and sensor 42. In step S2, the controller determines whether the monitored voltage raises above a threshold, for example the threshold 75 illustrated in FIG. 6. If so, it is checked in step S3 if the tap changer 30 operates at a maximum tap setting, i.e., whether the maximum number of turns of the primary winding is already switched into the circuit between the terminals 38 and 39. If this is the case (i.e., maximum available compensation is already being employed), other mitigation measures are taken in step S5, such as triggering a protection mechanism or the like. If further taps are available in step S3, then the tap of the auxiliary transformer is changed so as to increase the number of turns of the primary winding. Operation then continues in step S1. If the monitored voltage does not raise above a threshold in step S2, it is checked in step S6 if the monitored voltage drops below a threshold. If this is not the case, i.e., neither an upper nor a lower threshold is reached or exceeded, operation continues in step S1. Otherwise, if the voltage drops below such threshold, it is checked in step S7 if the tap changer operates at a minimum tap setting at which the minimum number of turns is provided in the primary winding, i.e., connected between the terminals 38 and 39. If the minimum tap setting has already been reached, then other mitigation measures are taken in step S9, such as activating an additional power supply (e.g., UPS) or the like to account for the under-voltage condition. If this is not the case in step S7, then the tap of the auxiliary transformer is changed in step S8 to decrease the number of turns that are connected in the primary winding. In embodiments, the method then continues in step S1. Accordingly, in either case, the tap setting is changed such that the voltage variation on the primary side is compensated and that the voltage on the secondary side is kept within the predefined limits.

It should be clear that the method may likewise be applied to monitoring the voltage on the secondary side. In embodiments, the method may also be modified by changing the tap on the secondary winding of the transformer. Again, it is noted that the transformer is a three-phase transformer and that the tap change is performed for the windings for each phase (i.e., three tap changes are performed for the three primary windings or three secondary windings of the transformer).

The auxiliary power system 10 and the respective operating method provide several advantages. The HVRT and LVRT capabilities of the auxiliary system are improved significantly, since even if the voltage on the primary side deviates significantly from the nominal operating voltage, the voltage on the secondary side can be kept quite stable. Due to the use of the semiconductor switches, the tap changing times are very fast, and may occur within less than two grid cycles, so that the auxiliary power consumers 60 are not exposed to over-/under-voltages for longer times. Since over the lifetime of the wind turbine, the auxiliary power consumers 60 are operated within the voltage limits determined for the secondary side, the lifetime of these components is increased and the risk of failure is reduced. There is also no need to increase the voltage rating for these components or to increase the insulation level for the whole auxiliary system and consumers. This allows the use of standard components, which are generally more cost-efficient and can have a reduced size. Furthermore, no modifications in the nacelle of the wind turbine are required, since the space requirements are essentially the same as for a conventional auxiliary transformer. Also, since the system can have an autonomous and independent control, maintenance procedures can be maintained and electrical connections can be re-used. No major changes to a conventional electric system of a wind turbine may be necessary.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine auxiliary power system configured to receive electrical power from an electrical power generating system of a wind turbine or from a power grid, the auxiliary power system comprising:
    an auxiliary transformer having a primary side configured to be coupled to the electrical power generating system of the wind turbine and a secondary side configured to be coupled to auxiliary power consumers of the wind turbine and to provide transformed electrical power to the auxiliary power consumers; and
    an electronic on-load tap changer provided on the auxiliary transformer, wherein the electronic on-load tap changer comprises taps on at least one transformer winding of the auxiliary transformer and semiconductor switches that are coupled to the taps and that are configured such that by controlling the semiconductor switches, a transformation ratio of the auxiliary transformer is adjustable to compensate for voltage variations on the primary side of the auxiliary transformer; and
wherein the auxiliary power system is configured to control the semiconductor switches to compensate for the voltage variations while the wind turbine is coupled to the power grid.

2. The auxiliary power system according to claim 1, wherein the electronic on-load tap changer is provided on the primary side of the auxiliary transformer.

3. The auxiliary power system according to claim 1, wherein to each each of the taps of the electronic on-load tap changer, one of the semiconductor switches is connected directly or via a changeover impedance.

4. The auxiliary power system according to claim 1, wherein the transformer winding comprises at least a first winding part and a second winding part, the first winding part and the second winding part being connectable in series, and the first winding part and the second winding part are each provided with one or more semiconductor switches that are switchable to take one or more turns of the respective winding part out of the series connection.

5. The auxiliary power system according to claim 4, wherein the first winding part comprises a number of turns selected such that when the electronic on-load tap changer is switched so that only the first winding part is connected in the respective transformer winding, the transformation ratio has a nominal ratio that provides a nominal auxiliary voltage on the secondary side of the auxiliary transformer when a nominal operating voltage is provided on the primary side of the auxiliary transformer.

6. The auxiliary power system according to claim 4, wherein the second winding part comprises between, 3% and 70% of the number of turns of the first winding part between 10% and 40% of the number of turns of the first winding part, or between 20% and 30% of the number of turns of the first winding part.

7. The auxiliary power system according to claim 1, wherein the semiconductor switches include power electronic switches.

8. The auxiliary power system according to claim 1, wherein to at least some of the taps, a changeover impedance is connected directly or via a semiconductor switch associated with a tap, wherein the changeover impedances are arranged such that during a tap change from a first tap to a second tap, a short circuit current between the first tap and the second tap passes through at least one changeover impedance.

9. The auxiliary power system according to claim 1, wherein for at least a part of the transformer winding, each tap of the part of the transformer winding is directly connected to one side of an associated semiconductor switch, wherein the other sides of the semiconductor switches connected to the taps of the part of the transformer winding are directly connected together.

10. The auxiliary power system according to claim 1, further comprising a controller configured to monitor a voltage on the primary side and/or on the secondary side of the auxiliary transformer and to control a tap setting of the electronic on-load tap changer in accordance with the monitored voltage.

11. The auxiliary power system according to claim 10, wherein the controller is configured to change the tap setting such that a voltage on the secondary side of the auxiliary transformer is maintained between predefined limits.

12. The auxiliary power system according to claim 10, wherein at least the voltage on the primary side is monitored and the controller is configured to change the tap setting upon the voltage on the primary side of the auxiliary transformer reaching or exceeding a respective threshold value to thereby adjust the voltage on the secondary side.

13. The auxiliary power system according to claim 10, wherein at least the voltage on the secondary side is monitored and the controller is configured to change the tap setting upon the voltage on the secondary side of the auxiliary transformer reaching or exceeding an upper or lower threshold value to thereby maintain the voltage on the secondary side between the upper and lower threshold values.

14. A wind turbine, wherein the wind turbine comprises:
- an electrical power generating system configured to generate electrical power from rotational mechanical energy; and
- an auxiliary power system according to claim 1, the auxiliary power system being coupled to the electrical power generating system.

15. A method of operating an auxiliary power system of a wind turbine, the auxiliary power system being configured to receive electrical power from an electrical power generating system of the wind turbine or from a power grid, wherein the auxiliary power system comprises an auxiliary transformer having a primary side configured to be coupled to the electrical power generating system of the wind turbine and a secondary side configured to be coupled to auxiliary power consumers of the wind turbine and to provide transformed electrical power to the auxiliary power consumers, and an electronic on-load tap changer provided on the auxiliary transformer, wherein the electronic on-load tap changer comprises taps on at least one transformer winding of the auxiliary transformer and semiconductor switches that are coupled to the taps, the method comprising:
- adjusting a transformation ratio of the auxiliary transformer by controlling the semiconductor switches of the electronic on-load tap changer to compensate for voltage variations on the primary side of the auxiliary transformer while the wind turbine is coupled to the power grid.

* * * * *